United States Patent [19]
Golan

[11] Patent Number: 5,972,213
[45] Date of Patent: Oct. 26, 1999

[54] LIQUID FILTER UTILIZING PLEATED DISC

[76] Inventor: Ilan Zadok Golan, 4404 Elenda St., Culver City, Calif. 90230

[21] Appl. No.: 09/071,148

[22] Filed: Apr. 27, 1998

[51] Int. Cl.[6] .................................................. B01D 27/06
[52] U.S. Cl. ........................ 210/186; 210/232; 210/445; 210/446; 210/451; 210/493.1
[58] Field of Search ..................................... 210/131, 167, 210/186, 232, 354, 398, 416.1, 445, 446, 450, 451, 493.1

[56] References Cited

U.S. PATENT DOCUMENTS

| | | |
|---|---|---|
| 247,865 | 10/1881 | Wodiska . |
| 1,035,653 | 8/1912 | Stubbe . |
| 1,241,519 | 10/1917 | Johnson . |
| 2,459,318 | 1/1949 | Hallinan . |
| 4,082,665 | 4/1978 | Schneider et al. . |
| 4,207,187 | 6/1980 | Booth . |
| 4,592,839 | 6/1986 | Rosenberg . |
| 4,842,739 | 6/1989 | Tang . |
| 5,284,582 | 2/1994 | Yang . |
| 5,360,164 | 11/1994 | Pape et al. . |
| 5,364,540 | 11/1994 | Sciuto . |
| 5,736,041 | 4/1998 | Skov . |
| 5,820,756 | 10/1998 | McEwen et al. . |
| 5,833,852 | 11/1998 | Yoon . |

*Primary Examiner*—Jay H. Woo
*Assistant Examiner*—Fred Prince
*Attorney, Agent, or Firm*—Small Larkin, LLP

[57] ABSTRACT

A liquid filter including an inlet portion, an outlet portion and a central portion having a first inner diameter and a second, reduced inner diameter and a pleated disc filter retained inside of the central portion of the filter by a spring, and the filter having at least one of the end fittings being a threaded fitting and having corresponding threads on a corresponding portion of the housing.

16 Claims, 4 Drawing Sheets

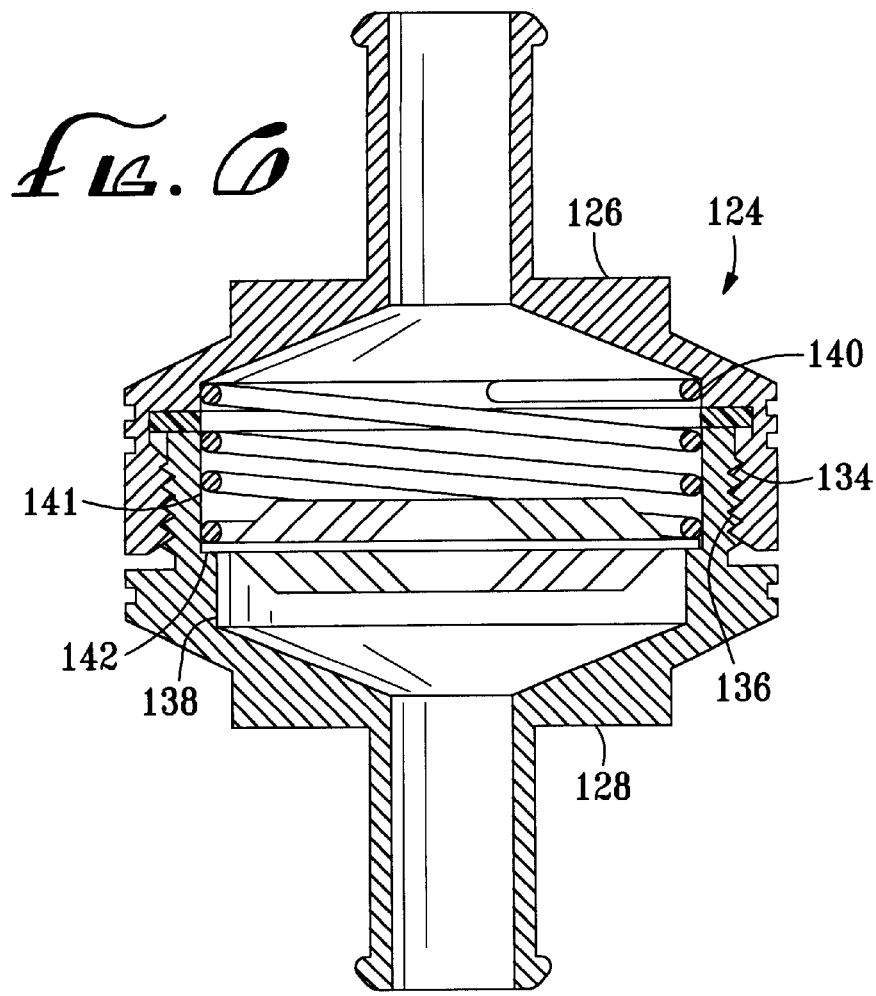
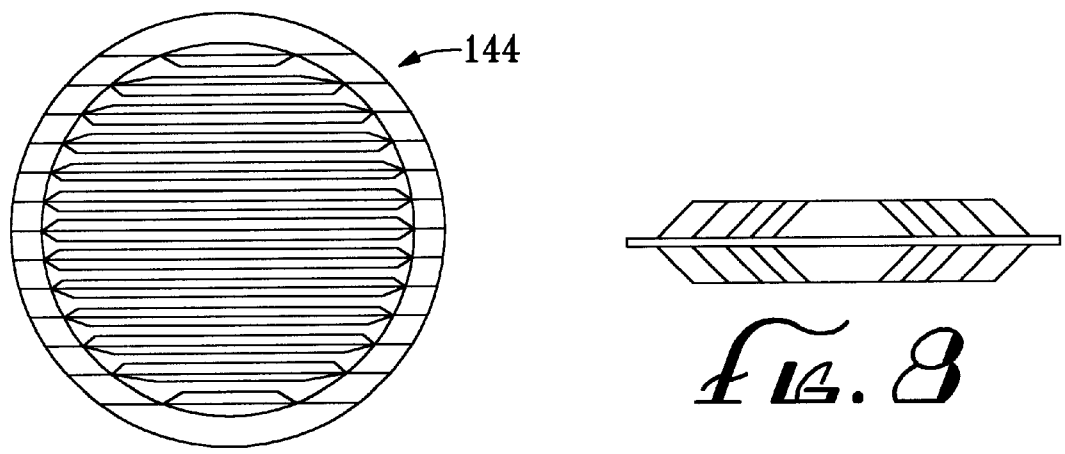

LIQUID FILTER UTILIZING PLEATED DISC

BACKGROUND OF THE INVENTION

A. Field of the Invention

The present invention is directed to a liquid filter.

B. Description of the Prior Art

Fluid filters are well known. However, such filters, especially for the automotive and/or motorcycle fields, are characterized by having replaceable, rather than reusable components, are without bypass capability and without cooling-fin capability. Furthermore, the use of the pleated filter disc element of the present invention in the automotive and/or motorcycle fields are heretofore unknown.

OBJECTS AND SUMMARY OF THE INVENTION

It is an object of the present invention to provide a liquid filter including a spring loaded internal filter element.

It is a further object of the present invention to provide a liquid filter having cooling fins.

It is a further object of the present invention to provide a liquid filter adapted to be easily disassembled and cleaned by the user.

BRIEF DESCRIPTION OF THE DRAWINGS

FIG. 6 is a cross-sectional view of the FIG. 5 embodiment.

FIG. 7 is a front view of a preferred alternate disc filter used in the present invention.

FIG. 8 is a side view of the FIG. 7 disc filter.

DESCRIPTION OF THE PREFERRED EMBODIMENTS

Figure 1:
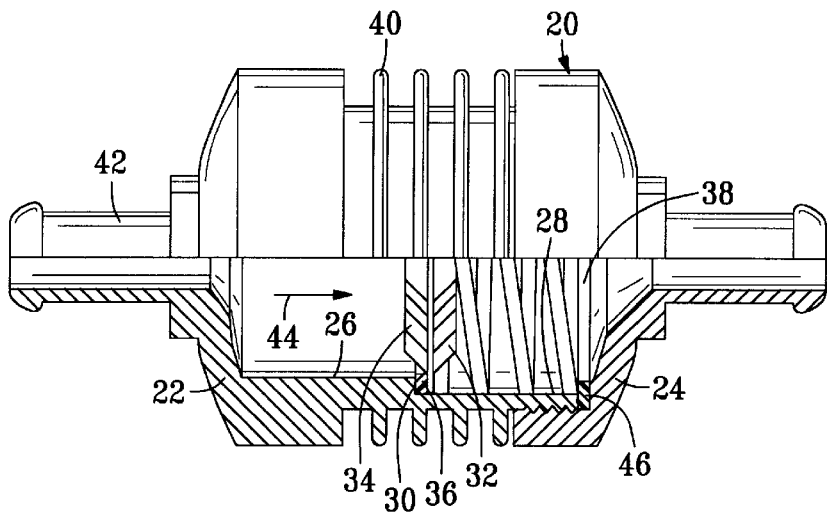
FIG. 1 is a side, partial cross-sectional view of a first embodiment of the present invention filter.

Referring to the Figures, and in particular FIGS. 1–2, a first embodiment of the present invention will be described. The FIG. 1 embodiment 20 includes a body 22 and an end cap 24. The filter 20 is generally of a hollow, symmetrical, cylindrical construction in which the internal diameter along a predetermined length of the housing body 22 is smaller than the predetermined internal diameter of an adjacent portion of the housing body 22, shown at, for example, 26 and 28, respectively, thereby providing for a shoulder or ledge 30. A generally circular, preferably pleated mesh filter 32 (also referred to as a disc filter), a screen 34, and a washer/gasket 36 having an outer diameter conforming in shape to, but slightly smaller than the internal diameter of that portion of the housing shown at 28 is positioned against ledge or seating surface 30 as illustrated in FIG. 1. Spring 38 is positioned inside of the body 22 between the end cap 24 and the filter 32. The body 22 includes a plurality of cooling fins 40, and barbed end fittings, such as shown at first end 42 in FIG. 1. End cap 24 and housing body 22 are provided with threads as illustrated so that the filter may be disassembled by rotating end cap 24 away from the housing. The filter, spring and other internal parts of the filter may then be cleaned, and the filter reassembled for continued use.

As may be appreciated, the spring-loaded mesh filter provides an effective by-pass so that liquid flow in the direction of arrow 44 may take place when the pressure on the filter, if blocked, exceeds the spring force of spring 38. The washer gasket 36 is preferably made of a teflon material and the washer gasket or O-ring 46 is preferably of an elastomeric material. In each case the washer/gasket/O-rings used in the present invention must be of a material suitable for the particular fluid flowing through the filter. For example, if the fluid flowing through the filter is a fuel, for example, a motorcycle, the washers, gaskets and O-rings must be of an appropriate material to operate in a gasoline environment. Such materials are well known to those of skill in this field. As shown with the orientation of the filter 20 so that fuel flow is the direction of arrow 44, pleated mesh filter 32 is upstream of the spring 38. The filter 32 may be bypassed in the event there is complete flow blockage at the upstream side 34 of the filter 32, and the pressure on the blocked filter 32 exceeds the force of the spring 38. Under these conditions the filter 32 will simply tilt slightly off of a vertical orientation so that some fuel will pass over the edge of the filter and through the filter downstream. This is known as the "racing option", orientation and is for use in racing or other situations in which the operator wants to maintain flow of fuel to the engine, even at the expense of severe damage and/or destruction of the engine due to impurities flowing through the fuel line. In a non-racing option, the filter 20 is placed in the fuel line so that the spring 38 is on the upstream side of the filter 32, i.e., the opposite orientation as shown in FIG. 1. In this configuration, there is no bypass capability around the filter 32, because it abuts against the ledge 30. In the event the filter 32 becomes completely clogged, the result is that no fuel would flow to the engine and the engine would shut down.

Figure 2:
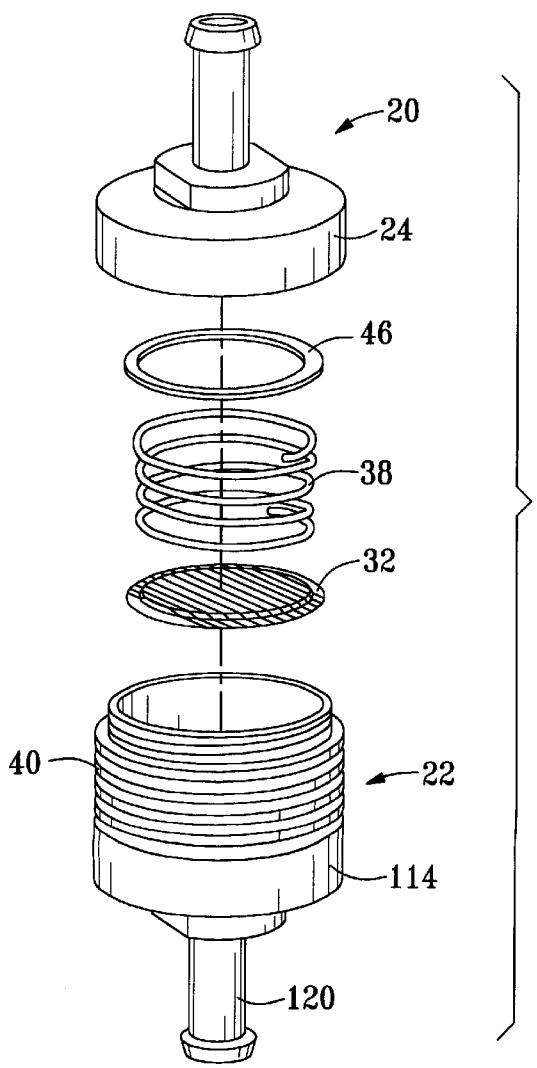
FIG. 2 is an exploded side view of the FIG. 1 embodiment.

Referring to FIG. 2, another view of the FIG. 1 embodiment is shown. Filter 20 is shown with a hollow, cylindrical housing 22 having a plurality of cooling fins 40, and, an integral machined end portion 114, with a barbed end fitting 120. At the opposite end of the housing, a machined threaded fitting 24 may be rotated on end off the housing 22. Filter components include the fluoropolymer washer 46, spring 38 and a pleated disc filter 32.

Figure 3:
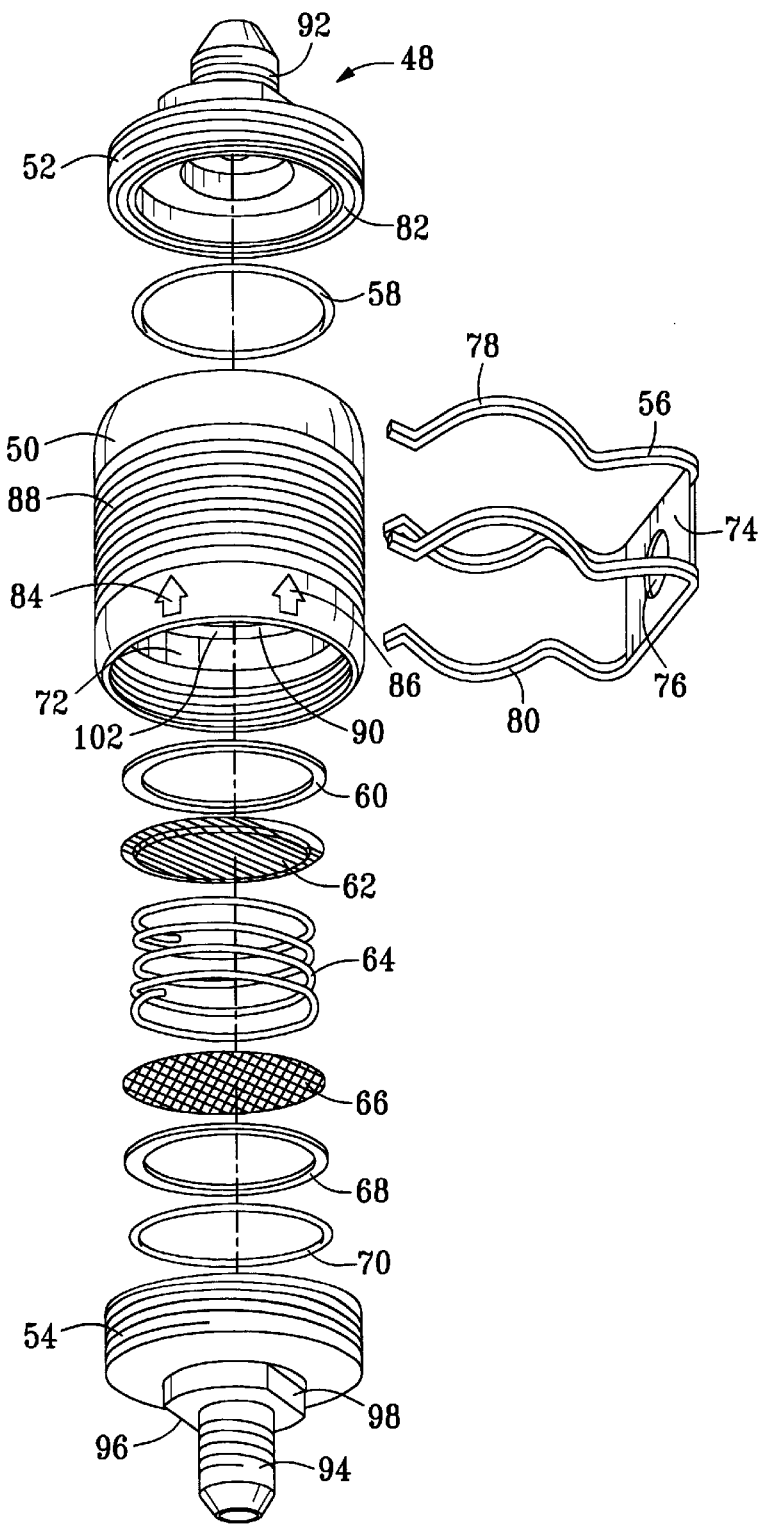
FIG. 3 is a partial, cutaway side view of an alternate embodiment.

Referring to FIG. 3, an alternate embodiment of the fuel filter of the present invention will be described. Filter 48 includes a generally hollow, cylindrical housing 50, a first threaded end cap 52, a second threaded end cap 54 and a clamp 56. Each end of the housing 50 includes an internal threaded portion into which each of the end fittings may be screwed. End caps 52 and 54 are shown with external threads. O-ring 58 is positioned against a shoulder 82 in the end fitting 52 to provide for a tight, leak-proof fit. Housing 50 includes a central portion with a reduced internal diameter having a predetermined length along the major length of the filter. This portion or ring 102 provides an abutment shoulder or ledge 90, and functions the same way as ledge 30 of the FIG. 1 embodiment. The shoulder 90, against which a washer 60, preferably made of a fluoropolymer, is positioned. Next, the pleated disc filter 62 is positioned along the inner surface 72 of the housing against the washer 60 and shoulder 90 to provide for a filtering function. The housing 50 preferably has flow direction markings, such as illustrated at 84 and 86. The washer 60 and disc filter 62 are positioned upstream of the spring 64 in the configuration shown in FIG. 2. Upstream of spring 64, a screen 66, an additional fluoropolymer washer 68 and another O-ring 70 are positioned inside of the housing 50. The second threaded end cap 54, is then screwed into place, to provide a fuel filter. In the configuration illustrated in FIG. 3 there is no bypass. By simply reversing the ends of the filter, from that as shown in FIG. 3, so that the spring 64 is downstream from filter 62 in the fuel line, a bypass function is provided. In this orientation, with substantial flow blockage as described above, the filter 62 will tilt, to permit some fuel flow around the filter.

The assembled filter may be held in filter clamp 56. Filter clamp 56 includes a base plate 74 having a set screw hole 76, and a first end leaf spring 78 and a second end leaf spring 80 as shown. The leaf spring ends of the filter clamp are sized and positioned to securely hold the filter housing 50 in a conventional fashion.

While the liquid filter of the present invention may be used for virtually any liquid, it is preferably used in the fuel lines, oil lines, water lines and other lines in which an in-line filtering function must be performed. The present invention filter is advantageous in that it provides a simple, sturdy filter design which may be quickly disassembled, cleaned and reassembled by simply removing the threaded end cap(s). In non-racing orientation, such as shown in FIG. 3, the disc filter is placed downstream of the spring, and thus, in the event of a complete blockage of the disc filter 62, flow would be stopped. In an application where the filter was used in a fuel line for an engine, the result would be the engine would stop due to lack of fuel.

When the filter is reversed, the disc 62 would be located upstream of the spring 64. In such an orientation where the filter itself became completely blocked, and the force of the fluid on the upstream side of the filter exceeded the force of the spring 64, then the spring will compress at one side, the filter will tilt, and liquid will flow in a bypass around the blocked filter.

As in FIGS. 1–2, the FIG. 3 embodiment housing 50 includes a plurality of cooling fins, one of which is illustrated at 88 externally. The number of cooling fins and their particular dimensions such as thickness, radius and number may vary from application to application. In general, the degree of cooling desired would determine the number and dimensions of the cooling fins, in accordance with known principles. As is well known, the greater the number of and surface area of the cooling fins, the more heat removal that may be achieved.

Referring to the threaded end fittings 52 and 54, external threaded fittings are shown at 92 and 94 for connection to upstream and downstream ends of the fuel line. Such end fittings are optional and alternate end fittings may, of course, be employed, such as the barbed-type end fitting as illustrated in FIG. 1. The end fittings also are preferably provided with two flat, parallel surfaces, such as shown at 96 and 98 on end fitting 54. These flat, parallel surfaces provide a seating surface for a wrench, or other turning device to facilitate assembly and disassembly of the filter.

Figure 4:
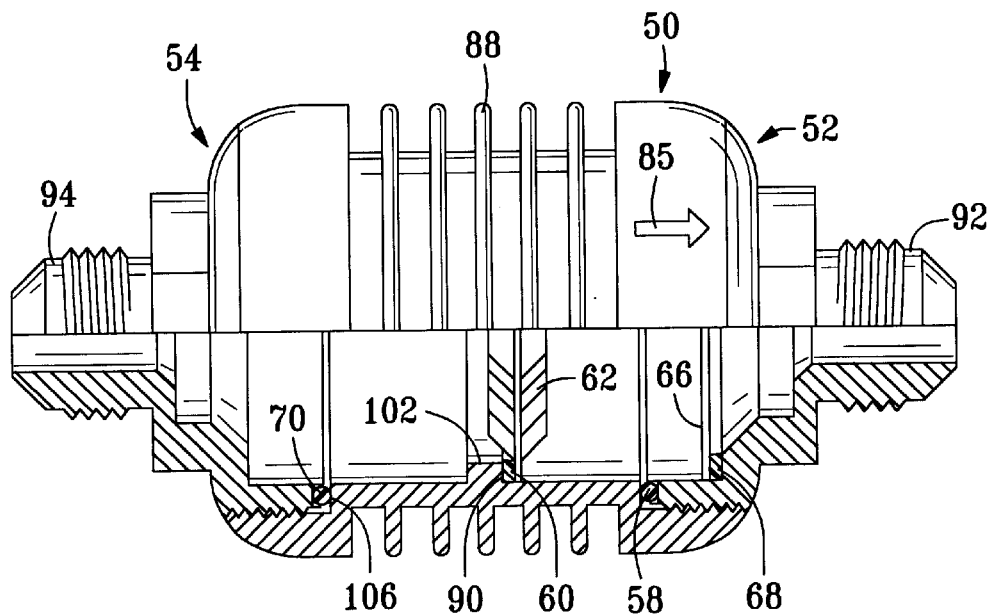
FIG. 4 is an exploded perspective view of the FIG. 3 embodiment of the present invention.

Referring to FIG. 4, a side, partial cutaway view of the FIG. 3 embodiment, flow arrow 85 shows the direction of flow opposite the direction of flow shown by arrows 84 and 86 in FIG. 2. The orientation of FIG. 4 is thus opposite that the orientation of FIG. 3 with respect to direction of flow of fluid through the filter. The end cap 52 is shown to provide for a threaded fitting to the housing 50. O-ring 58 provides for sealing of the end cap 52 to the housing 50.

Internal to housing 50 internal ring 102 formed by a section of the housing having a reduced inner diameter, and providing an abutment surface 90 against which the washer, preferably made of a fluoropolymer, and the pleated disc filter 62 may abut and be held in place by the spring 64 (not shown). O-ring 70 is shown positioned between end fitting 54 and abutment shoulder 106 of the housing 50.

Figure 5:
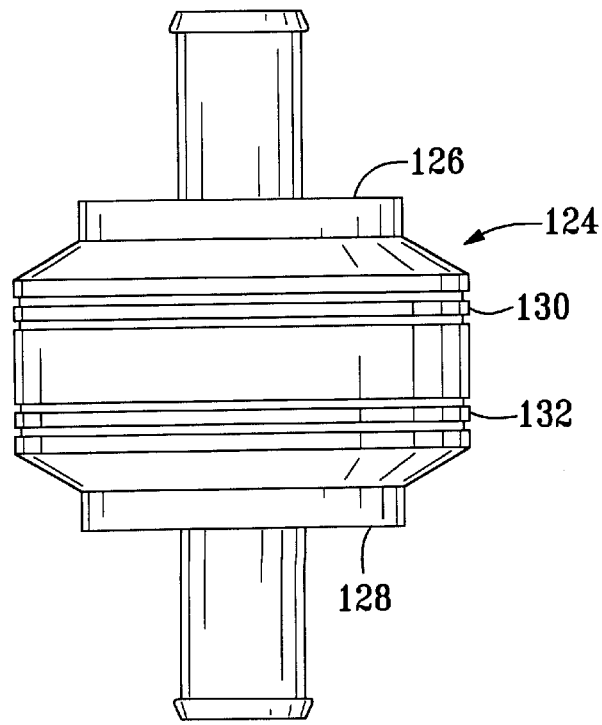
FIG. 5 is a side view of another alternate embodiment of the present invention.

With reference to FIGS. 5 and 6, a third embodiment of the present invention filter will be described. Filter 124 is shown with first end 126, second end 128 and cooling fins 130 and 132. The end fittings are barbed-type end fittings, and are unnumbered. The filter 124 is intended to be a very small filter relative to the size of the FIG. 3 embodiment and, accordingly, is one in which no separate central housing portion is included. Rather, the filter body is formed by the two end sections 126 and 128 respectively, as will be described in reference to FIG. 6.

First end portion 126 is shown as having an internally threaded portion 134 which is complimentary to and engages with external threaded portion 136 of the second end 128. The size of the end fittings, and thread specifications are matters of choice within the skill of those in this field. However, it is preferred that the filter of this design be used in applications that are relatively small, such as for a small motorcycle or other relatively small internal combustion engine fuel line.

The internal wall of the end 126, shown at 140, defines an inner diameter for the first end section 126. Preferably, a corresponding inner diameter is found opposite the threaded portions, as shown at 141 which is an internal diameter of the portion 128 opposite its external threads 136. An intermediate portion of the second end 28 includes an area of reduced internal diameter, shown at 138. This reduced diameter section, together with the larger internal diameter section at 141, provides for an abutment surface 142 against which the fluoropolymer washer, spring, screen and/or filter disc may rest. These components are now shown with respect to the filter 124; however, they are positioned and function like corresponding components as illustrated and described with respect to FIGS. 1–4.

The sizing of the filters illustrated in FIGS. 1–6 is a matter of choice. However, it is preferred that the filter of FIGS. 3 and 4, having a separate central housing portion, is for relatively larger filters, and is used for applications in which a relatively large filter is needed. The filter illustrated in FIGS. 1 and 2 is preferably of an intermediate size, and the filter illustrated in FIGS. 5 and 6 is primarily intended for use in applications where the fuel line, and consequently the filter, is relatively small in comparison to the other two embodiments.

With reference to FIGS. 7 and 8, the pleated mesh filter of the present invention will be described. The pleated mesh filters of the present invention 144, as shown in FIGS. 7 and 8 are pleated, recleanable disc filters commercially available from Norman Filters, Bridgeview, Ill., as Part No. F-4173. These filters are available in various outer diameters, pleated diameters, and thicknesses, each having specified effective area. The outer diameters range in size from 0.375 to 1.375"; the inner diameter sizes range from 0.300 to 1.250"; the thicknesses range from 0.100 to 0.170" and the effective area range in square inches ranges from 0.22 square inches to 6.60 square inches. The seal ring around the outer diameter is available in various materials including a fluoropolymer, buna-n, viton, copper and brass.

The size of the mesh also varies. In accordance with the following table, mesh size is shown with a micron rating which is defined as retention of particles whose two smallest dimensions exceed the specified rating.

TABLE 1

| Micron Code | 14/28 Micron Rating Nominal | Absolute |
| --- | --- | --- |
| 2X | 2 | 10 |
| 2 | 2 | 15 |
| 5 | 5 | 20 |
| 10 | 10 | 25 |
| 20 | 20 | 40 |
| 40 | 40 | 75 |
| 75 | 75 | 100 |
| 100 | 100 | 150 |
| 200 | 200 | 300 |

The filters of the present invention achieve advantages not previously known, due to their simple design, use of the pleated filter, the bypass feature and the simple, disassembly, cleaning capability and reassembly capabilities. For their external dimensions, they provide for unexpectedly high flow rates at high levels of purity.

The preferred specifications for the preferred embodiment filters of the present invention are set forth below in Table 2.

TABLE 2

| | LARGE | MEDIUM | SMALL |
| --- | --- | --- | --- |
| Material | Aluminum 6061-T6 | Aluminum 6061-T6 | Aluminum 6061-T6 |
| Finish | Clear Anodized | Buffed and Chrome Plated | Buffed and Chrome Plated |
| Body Length | 2.900" (inch) | 1.750" (inch) | 0.875" (inch) |
| Overall Length (Include Fittings) | 4.250" (inch) | 2.950" (inch) | 2.100" (inch) |
| Body Diameter | 2.000" (inch) | 1.350" (inch) | 1.350" (inch) |
| Filter Medium | 304 Stainless Steel Pleated Disc | 304 Stainless Steel Pleated Disc | 304 Stainless Steel Pleated Disc |
| Filter Diameter | 1.375" (inch) | 1.000" (inch) | 1.000" (inch) |
| Effective Filtering Area | 6.2 Square Inches | 3.2 Square Inches | 3.2 Square Inches |
| Filter Efficiency | 10 Micron (.000392") | 10 Micron (.000392") | 10 Micron (.000392") |
| Flow Restriction (virtually none) | 0.5% (½%) | 0.5% (½%) | 0.5% (½%) |
| Operating Pressure | 6,000 PSI | Not Available | Not Available |
| Flow Rate | 15.3 Gallons Per Minute | 6.2 G.P.M. | 6.2 G.P.M. |
| Barbed Fitting Sizes | ¼" $^{5}$⁄$_{16}$" ⅜" ½" | $^{5}$⁄$_{16}$" ¼" | $^{5}$⁄$_{16}$" ¼" |
| AN Fitting Sizes | 4-AN 6-AN 8-AN 10-AN | 4-AN 6-AN | Optional |

The above filters provide maximum flow, and optimum filtering simultaneously with virtually no restriction. The filter element can be cleaned and reused indefinitely. This filter is specifically designed and manufactured for rugged high temperature, high filtration environments.

While the liquid filter of the present invention may be used in virtually any liquid, and even gaseous fluid environments, the preferred use is as an in-line fuel filter for an internal combustion engine, such as, for example, in the automotive and/or motorcycle fields. In such a use, this fuel filter is installed in the fuel line between the fuel tank and the engine's fuel intake system. It's location is selected to be one for ease of installation and servicing. The filter does not need to be close to the fuel intake system in order to operate properly. The filter of the present invention may be used in flexible fuel lines as well as rigid fuel lines.

If used in a flexible fuel line, a 3" section of the fuel line is removed at a chosen point, and the filter clamp 56 is mounted to a rigid panel on the motorcycle to secure the filter in place. One end fitting, either barbed, threaded or other, may be fit into the fuel line and fastened to provide a tight fit. The housing, together with the internal screen, filter disc, washers and O-rings should be assembled, and oriented in the proper direction, as indicated by the fuel flow markings. Also, when barbed end fittings are used, it is recommended that conventional hose clamps, of conventional design, are used to secure the hose to the filter. Next, the remaining end cap is fit within the other open section of fuel line, tightness is checked and the system is started and checked for leaks.

When used with rigid fuel lines, a section of the fuel line is cut out, the length to be cut out determined in accordance with known principles and the size of the filter used. Again, the filter is assembled in the proper direction with reference to flow direction fittings, and either the bypass or non-bypass configuration of filter disc and screen is chosen.

The filter of the present invention is conveniently serviced by simply removing the filter from the filter line, unscrewing the end fitting(s), removing the pleated filter disc and back flushing the filter disc and screen with, preferably, either the same fuel used for the filter or an air gun. The cleaned, pleated filter and screen are replaced, the filter is reassembled and reused.

It will be understood that certain features and subcombinations are of utility and may be employed without reference to other features and subcombinations as they are outlined within the description above and within the claims appended hereto. While the preferred embodiments and application of the invention have been described, it is apparent to those skilled in the art that the objects and features of the present invention are only limited as set forth in the claims appended hereto.

I claim:

1. A liquid filter comprising:
   a housing, an inlet orifice, an outlet orifice, a spring, a pleated disk filter;
   said housing having a generally circular cross section, a first internal diameter and at least a second internal diameter that is greater than said first internal diameter; and an abutment surface extending between said first internal diameter and said second internal diameter and positioned within said housing; and said pleated disk filter positioned within said housing between said spring and said abutment surface.

2. The filter of claim 1 further including a plurality of cooling fins positioned radially about the housing.

3. The filter of claim 1 further including an end cap integral with said housing.

4. The filter of claim 1 further including threads at at least one end of the housing.

5. The filter of claim 1 further including identical end fittings positioned at each end of the housing.

6. The filter of claim 1 further including an end fitting positioned at the end of the housing, the end fitting including at least two flat surfaces adapted to provide a seating surface for a wrench.

7. The filter of claim 1 further including a clamp adapted to retain said housing and adapted to be secured to another surface.

8. The filter of claim 1 wherein the pleated disk filter outer diameter is at least 0.375 inch.

9. The filter of claim 1 wherein the pleated disk filter inner diameter is at least 0.300 inch.

10. The filter of claim 1 wherein the pleated disk filter thickness is at least 0.100 inch.

11. The filter of claim 1 wherein the pleated disk filter effective area is at least 0.22 square inch.

12. The filter of claim 1 wherein the pleated disk filter is adapted to provide flow rates in the range of 6.2 to 15.3 gallons per minute at a filter efficiency of 10 micron (0.000392 inch).

13. A liquid filter comprising:

a housing having a predetermined cross section, threads at each end, at least two different internal diameters and an abutment surface within said housing and extending between said two diameters;

a first threaded end fitting adapted to engage one end of the housing and a second threaded end fitting adapted to engage the other end of the housing;

a spring;

a pleated disk filter positioned within said housing between said spring and said abutment surface.

14. The filter of claim 13 wherein the pleated disk filter is adapted to provide flow rates in the range of 6.2 to 15.3 gallons per minute at a filter efficiency of 10 micron (0.000392 inch).

15. A liquid filter comprising:

a first threaded housing portion having a cross section, at least two different internal diameters and an abutment surface within said housing and extending between said diameters;

a second threaded housing portion adapted to engage said first housing portion;

a spring; and a pleated disk filter positioned within said first threaded housing portion between said spring and said abutment surface.

16. The filter of claim 13 wherein the pleated disk filter is adapted to provide flow rates in the range of 6.2 to 15.3 gallons per minute at a filter efficiency of 10 micron (0.000392 inch).

* * * * *